(12) United States Patent
Owen et al.

(10) Patent No.: US 10,428,718 B2
(45) Date of Patent: Oct. 1, 2019

(54) COMPACT INLINE INLET WITH INTEGRATED CAST RING

(71) Applicant: Tenneco Automotive Operating Company Inc., Lake Forest, IL (US)

(72) Inventors: Daniel J. Owen, Parma, MI (US); Mark Kluesner, Grass Lake, MI (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 331 days.

(21) Appl. No.: 15/494,592

(22) Filed: Apr. 24, 2017

(65) Prior Publication Data

US 2017/0321592 A1   Nov. 9, 2017

Related U.S. Application Data

(60) Provisional application No. 62/333,464, filed on May 9, 2016.

(51) Int. Cl.
| | | |
|---|---|---|
| *F01N 13/14* | (2010.01) | |
| *F01N 13/18* | (2010.01) | |
| *F01N 3/28* | (2006.01) | |

(52) U.S. Cl.
CPC ....... *F01N 13/1888* (2013.01); *F01N 13/141* (2013.01); *F01N 13/1805* (2013.01); *F01N 13/1838* (2013.01); *F01N 3/2892* (2013.01); *F01N 2240/20* (2013.01); *F01N 2450/22* (2013.01); *F01N 2470/08* (2013.01); *F01N 2530/04* (2013.01); *F01N 2530/26* (2013.01); *Y02A 50/2322* (2018.01)

(58) Field of Classification Search
CPC ............... F01N 13/1888; F01N 13/141; F01N 13/1805; F01N 13/1838; F01N 3/2892; F01N 3/2066; F01N 2240/20; F01N 2450/22; F01N 2470/08; F01N 2530/04; F01N 2530/26; Y02A 50/2322
USPC .......................................................... 60/324
See application file for complete search history.

(56) References Cited

U.S. PATENT DOCUMENTS

| | | |
|---|---|---|
| 8,721,977 B2 | 5/2014 | Wikaryasz et al. |
| 8,756,923 B2 | 6/2014 | Tamamidis |
| 9,140,174 B2 | 9/2015 | Wikaryasz et al. |
| 9,163,549 B2 | 10/2015 | Wikaryasz et al. |

*Primary Examiner* — Audrey K Bradley
*Assistant Examiner* — Kelsey L Stanek
(74) *Attorney, Agent, or Firm* — Harness, Dickey & Pierce, P.L.C.

(57) ABSTRACT

An exhaust gas aftertreatment system for a vehicle includes a cylindrical inner shell, a cylindrical outer shell, an inner end cap, a metal mounting member, and an outer end cap. The inner shell is configured to guide exhaust gas. The outer shell forms a first gap to the inner shell. The inner end cap encloses an open end of the outer shell. The inner end cap includes a first axially-extending lip. The inner end cap is fixed to the inner shell. The outer end cap is fixed to the inner end cap. The outer end cap includes a second axially-extending lip. The outer end cap and the inner end cap cooperate to encapsulate the mounting member. The first axially-extending lip is sandwiched between the outer shell and the second axially-extending lip.

20 Claims, 7 Drawing Sheets

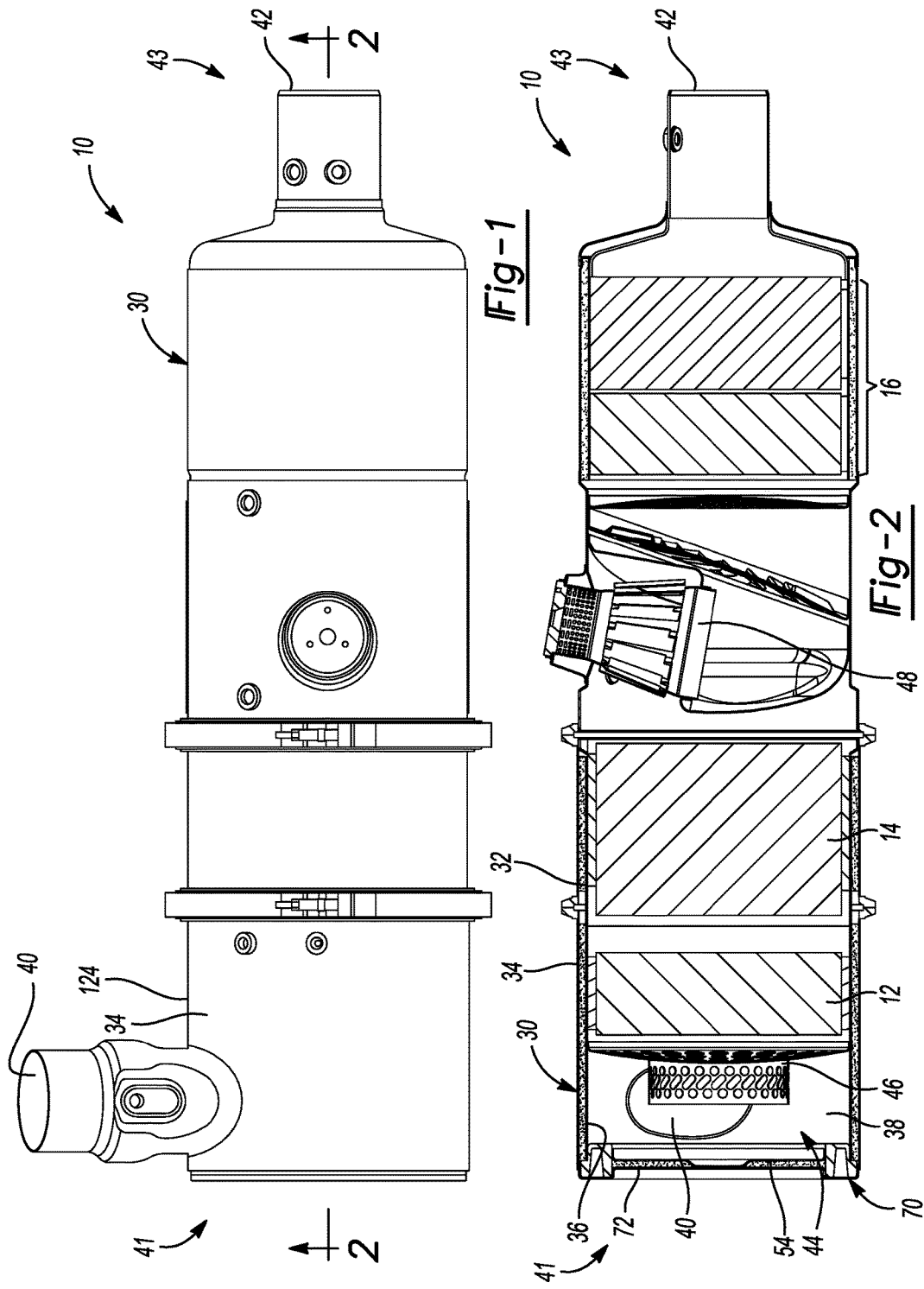

COMPACT INLINE INLET WITH INTEGRATED CAST RING

CROSS-REFERENCE TO RELATED APPLICATIONS

This application claims the benefit of U.S. Provisional Application No. 62/333,464, filed on May 9, 2016. The disclosure of the above application is incorporated herein by reference.

FIELD

The present disclosure relates to diesel exhaust gas aftertreatment devices.

BACKGROUND

This section provides background information related to the present disclosure which is not necessarily prior art.

Exhaust gas treatment devices such as catalytic converters, diesel oxidation catalysts, diesel particulate filters, and the like, may be employed in various applications to treat exhaust gasses emitted from internal combustion engines. Many of the exhaust gas treatment devices include relatively heavy components such as a ceramic substrate or a catalyst bed for treating the exhaust. The system for coupling the exhaust treatment device to the vehicle must withstand a wide range of external inputs such as when a vehicle wheel enters and exits a pothole in the road.

Typical exhaust treatment devices are fixed to the vehicle underbody or frame with a number of welded brackets or straps. While these arrangements may have sufficiently supported the exhaust treatment device in the past, the cost and complexity of individually welding support brackets to the exhaust treatment device is undesirable. Depending on the number of brackets used and their location, stress concentrations may be introduced that may negatively affect the useful life of the exhaust treatment device. In addition, the use of clamps may introduce additional challenges in mounting to assure the proper orientation of the exhaust treatment device and the clamp in order to clear other vehicular components.

One known exhaust treatment device includes an inlet end formed as a casting that is subsequently coupled to a sheet metal housing. The casting includes a mounting provision for the exhaust treatment device. Unfortunately, as the entire inlet assembly is formed from a cast component, heat is transferred readily from the interior of the exhaust treatment device to an exterior surface of the cast inlet assembly. Most end users and Original Equipment Manufacturers prefer an insulated arrangement where the external temperature of the treatment device remains below a predetermined maximum temperature. Furthermore, the casting is relatively large, heavy and costly. Accordingly, it may be beneficial to provide an improved exhaust treatment device including a cost effective integral mounting system having sufficient thermal shielding.

SUMMARY

In accordance with an aspect of the subject disclosure, an exhaust gas aftertreatment system for a vehicle includes a cylindrical inner shell, a cylindrical outer shell, an outer end cap, a metal mounting member, and an inner end cap. The inner shell is configured to guide exhaust gas. The outer shell is disposed around the inner shell. The outer shell forms a first gap to the inner shell. The outer end cap encloses an open end of the outer shell. The outer end cap includes a central wall and a peripheral portion. The peripheral portion includes an axially-extending radially-inner wall, a peripheral wall extending from the radially-inner wall, and an axially-extending radially-outer lip extending from the peripheral wall and opposite the radially-inner wall. The radially-inner wall, the peripheral wall, and the radially-outer lip define a pocket. The mounting member is partially disposed within the pocket. The mounting member is configured to be in fluid communication with the exhaust gas. The mounting member includes an annular body and a central aperture. The inner end cap includes an axially-extending lip. The axially-extending lip is coupled to the mounting member to enclose the central aperture of the mounting member. The mounting member and the inner end cap enclose an open end of the inner shell.

In another aspect of the subject disclosure, an exhaust gas aftertreatment system for a vehicle includes a cylindrical inner shell, a cylindrical outer shell, an inner end cap, a metal mounting member, and an outer end cap. The inner shell is configured to guide exhaust gas. The outer shell forms a first gap to the inner shell. The inner end cap encloses an open end of the outer shell. The inner end cap includes a first axially-extending lip. The inner end cap is fixed to the inner shell. The outer end cap is fixed to the inner end cap. The outer end cap includes a second axially-extending lip. The outer end cap and the inner end cap cooperate to encapsulate the mounting member. The first axially-extending lip is sandwiched between the outer shell and the second axially-extending lip.

In still another aspect of the subject disclosure, an exhaust gas aftertreatment for a vehicle includes an inner shell, an outer shell, an inner end cap, an outer end cap, and a mounting member. The inner shell is configured to guide exhaust gas. The inner shell includes a first axially-extending lip. The outer shell is fixed to the inner shell at the first axially-extending lip. The outer shell forms a first gap with the inner shell. The outer end cap encloses an open end of the inner shell. The outer end cap has a second axially-extending lip. The metal mounting member is enclosed in an annular area defined by the outer end cap, the inner end cap, and the inner shell. The inner end cap is fixed to one of the mounting member or the inner shell. The first axially-extending lip is sandwiched between the outer shell and the second axially-extending lip.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a side view of an exhaust gas aftertreatment system constructed in accordance with the subject disclosure;

FIG. 2 is a cross-sectional view of the exhaust gas aftertreatment system of FIG. 1 taken at line 2-2;

Corresponding reference numerals indicate corresponding parts throughout the several views of the drawings.

DETAILED DESCRIPTION

Figure 3:
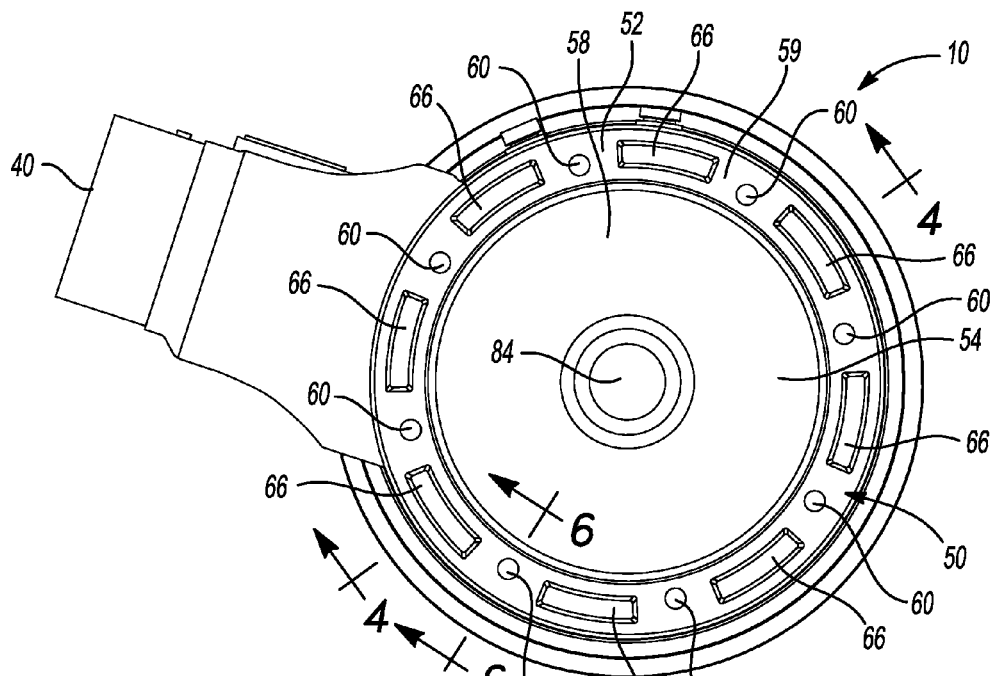
FIG. 3 is an end view of the exhaust gas aftertreatment system of FIG. 1.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-6 depict an exemplary system 10 for treating an exhaust gas stream from an engine (an "exhaust gas aftertreatment system"). The system 10 includes one or more exhaust treatment elements, such as a DOC catalyst 12, a DPF monolith 14, and an SRC catalyst 16, by way of non-limiting example. Other exhaust treatment elements may be used in lieu of the DOC catalyst 12, the DPF monolith 14, and the SRC catalyst 16. The arrangement of exhaust treatment devices depicted in the figures is merely for illustrative purposes. The DOC catalyst 12, the DPF monolith 14, and the SRC catalyst 16 may be interconnected with service clamps.

Figure 4:
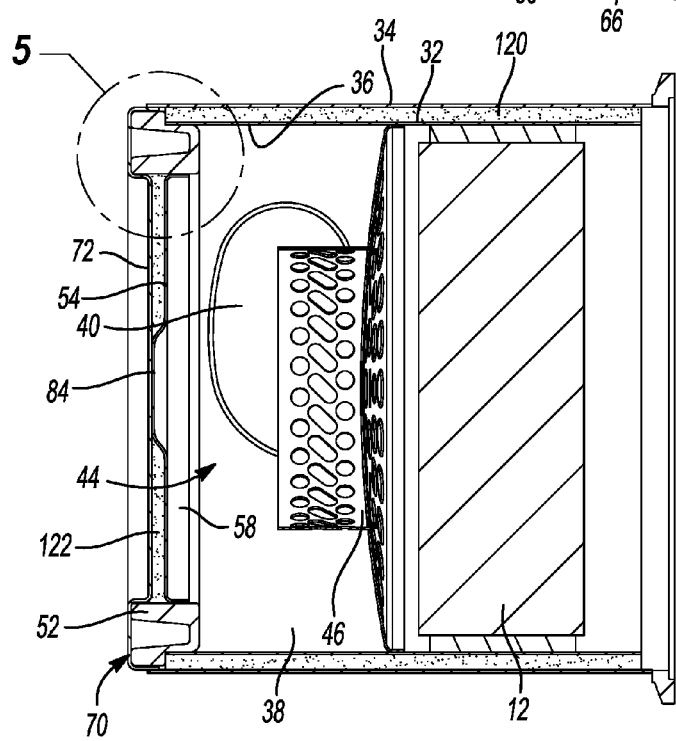
FIG. 4 is a cross-sectional view of an inlet chamber of the exhaust gas aftertreatment system of FIG. 1 taken at line 4-4 of FIG. 3.

The system 10 includes a housing 30 having a cylindrical inner shell 32 and a cylindrical outer shell 34 disposed around the inner shell 32 (best shown in FIG. 4). An inner surface 36 of the inner shell 32 defines an interior chamber or flow path 38 for exhaust gas. The flow path 38 extends between an exhaust gas inlet 40 disposed at a first end 41 of the system 10 and an exhaust gas outlet 42 disposed at a second end 43 of the system 10. However, in another example (not shown), the exhaust gas inlet may be disposed on the second end and the exhaust gas outlet may be disposed on the first end. Exhaust gas enters at the inlet 40 and flows into an inlet chamber 44. The inlet chamber 44 is fluidly connected to a diffuser 46. The diffuser 46 directs the exhaust gas through one or more additive injectors (not shown), a reductant mixer 48, and the exhaust treatment elements (i.e., DOC catalyst 12, the DPF monolith 14, and the SCR catalyst 16) to the outlet 42.

Figure 5:
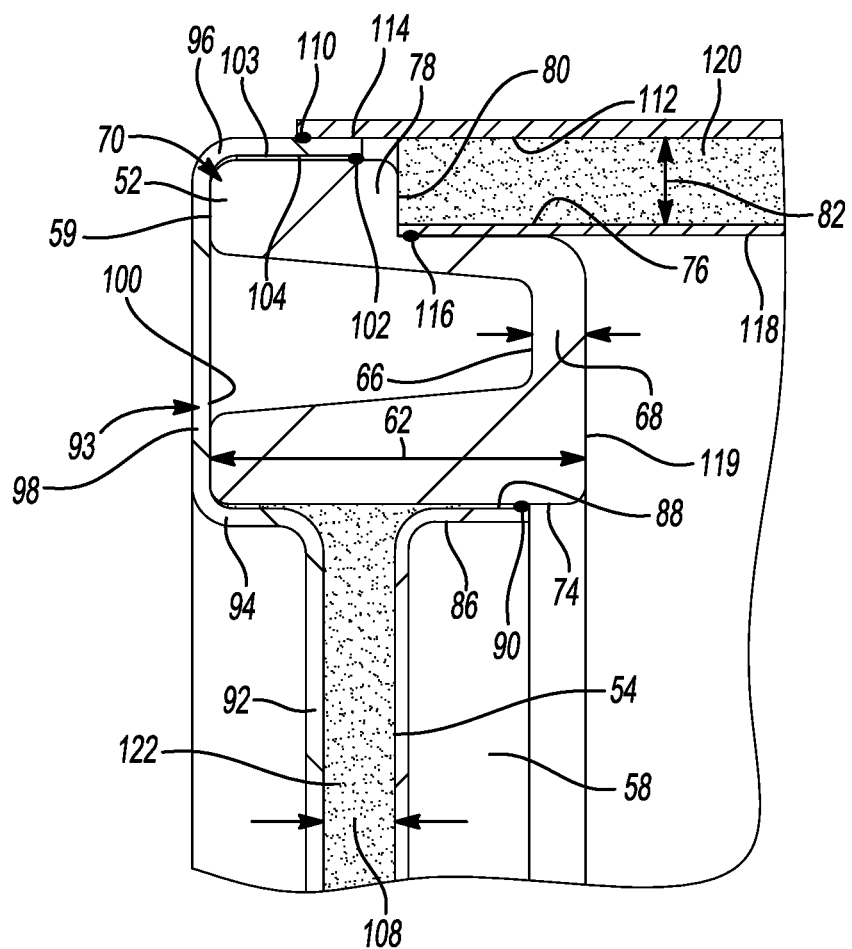
FIG. 5 is a detail cross-sectional view of a mounting assembly of the exhaust gas aftertreatment system of FIG. 4.
Figure 6:
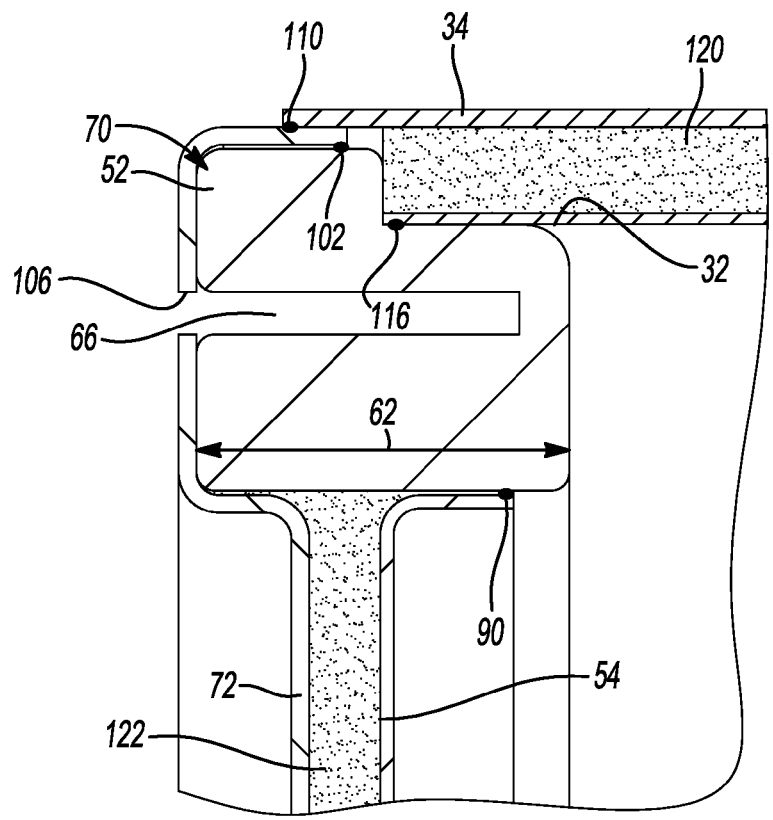
FIG. 6 is a detail cross-sectional view of the mounting assembly taken at line 6-6 of FIG. 3.

Referring now to FIG. 3, an end view of the system 10 from the first end 41 including a mounting subassembly 50 is provided. The mounting subassembly 50 includes a metal mounting member 52, an inner end cap 54, the inner shell 32 (shown in FIG. 5), and the outer shell 34 (shown in FIG. 5). The mounting member 52 may have an annular shape and include a central aperture 58. As best shown in FIGS. 4-6, the inner end cap 54 extends through the central aperture 58 of the mounting member 52.

Returning to FIG. 3, a first end surface 59 of the mounting member 52 includes a mounting provision that may comprise a plurality of axially-spaced apertures 60. Each of the apertures 60 may include a plurality of threads (not shown). The apertures 60 accommodate a respective plurality of fasteners (not shown) for mounting the system 10 to a vehicle. The apertures 60 may include threads (not shown) having a depth that is controlled to a distance less than a mounting member thickness 62 (shown in FIGS. 5-6) so that the apertures 60 do not provide a leak path for exhaust gas to escape the inlet chamber 44.

To reduce the mass of the mounting member 52 and provide improved resistance to heat transfer, the mounting member 52 may include axially-spaced thinned areas 66. Thinned areas 66 include recesses extending from the first end surface 59 a distance less than the thickness 62. While the thinned areas 66 are shown located between the apertures 60, one skilled in the art would recognize that the thinned areas 66 could be located in any region where structural support is not required. Referring now to FIGS. 4-5, while the thinned areas 66 may have a trapezoidal cross section, one skilled in the art would recognize that the thinned areas could have a variety of other geometries, such as rectangular or semi-ellipsoidal, by way of non-limiting example. In other examples, the thinned areas 66 may not be identical to one another. A second mounting member thickness 68 in the thinned areas 66 may be less than the first mounting member thickness 62 in adjacent areas. In some examples, the second mounting member thickness 68 may be different at each thinned area 66.

With reference to FIGS. 4-6, the inlet chamber 44 of the system 10 is at least partially defined by a mounting assembly 70. The mounting assembly 70 includes the inner shell 32, the outer shell 34, the mounting member 52, the inner end cap 54, and an outer end cap 72. The inner and outer shells 32, 34 and the inner and outer end caps 54, 72 may comprise metal.

The mounting member 52 includes a cylindrical radially-inner surface 74 that defines the central aperture 58. A cylindrical radially-outer surface 76 includes a flange 78. A dimension of the flange 78 is set by a radially-extending step 80. The radially-extending step 80 can be used as a guide to center the mounting member 52 in the inlet chamber 44 and to set a distance or first gap 82 between the inner and outer shells 32, 34. The radially-extending step 80 at least partially closes the first gap 82 between the inner shell 32 and the outer shell 34.

The inner end cap 54 includes an axially-extending central protrusion 84 and an axially-extending lip 86. The central protrusion 84 can be used to install the inner end cap 54 in the inlet chamber 44. A radially-outer surface 88 of the axially-extending lip 86 of the inner end cap 54 is attached to the radially-inner surface 74 of the mounting member 52. A first weld 90 may sealingly couple the mounting member 52 to the inner end cap 54.

The outer end cap 72 includes a central wall 92 and a peripheral portion 93. The peripheral portion 93 includes an axially-extending radially-inner wall 94, an axially-extending radially-outer lip 96 opposite the radially-inner wall 94, and an radially-extending peripheral wall 98 extending between the radially-inner wall 94 and the radially-outer lip 96 and substantially parallel to the central wall 92. The peripheral portion 93 defines a pocket 100 sized and shaped to complement the mounting member 52. The pocket 100 may have an annular shape. The peripheral portion 93 partially wraps around the mounting member 52 so that the mounting member 52 is partially disposed in the pocket 100. The radially-inner wall 94 of the outer end cap 72 is adjacent to the radially-inner surface 74 of the mounting member 52. The peripheral wall 98 of the outer end cap 72 is adjacent to the first end surface 59 of the mounting member 52. The radially-outer lip 96 of the outer end cap 72 is adjacent to the flange 78 of the mounting member 52. A second weld 102 sealingly couples the a radially-outer surface 103 of the flange 78 of the mounting member 52 to a radially-inner surface 104 of the radially-outer lip 96 of the outer end cap 72.

The peripheral wall 98 of the outer end cap 72 encloses the thinned areas 66 of the mounting member, as shown in FIGS. 4-5. As shown in FIG. 6, the peripheral wall 98 of the outer end cap 72 includes a plurality of axially-spaced apertures 106 aligned with the plurality of axially-spaced apertures 60 of the mounting member 52 to accommodate the plurality of fasteners (not shown).

A second gap 108 is defined by the inner end cap 54 and the outer end cap 72. A dimension of the second gap 108 is set by the central protrusion 84 of the inner end cap 54. One skilled in the art would recognize that the central protrusion 84 could alternatively be disposed on the outer end cap 72 to set the second gap 108. Both the inner end cap 54 and the outer end cap 72 are relatively thin and lightweight to improve fuel economy of the vehicle.

The outer end cap 72 engages the outer shell 34 to enclose an open end 109 of the outer shell 34. A third weld 110 is disposed between a radially-inner surface 112 of the outer shell 34 and a radially-outer surface 114 of the outer end cap 72 to sealingly couple the outer shell 34 to the mounting member. The mounting member 52 and the inner shell 32, together, enclose the inner shell 32. A fourth weld 116 is disposed between a radially-inner surface 118 of the inner shell 32 and the radially-outer surface 76 of the mounting member 52 to sealingly couple the inner shell 32 to the mounting member 52. A second end surface 119 of the mounting member 52 opposite the first end surface 59 and a portion of the radially-inner surface 74 of the mounting member 52 are exposed to the inlet chamber 44 and form part of the inlet chamber 44. Thus, the mounting member 52 is configured to be in fluid communication with the exhaust gas.

The mounting member 52 and the inner end cap 54, direct the flow of exhaust gas through the system. The outer end cap 72 may improve the aesthetics of the system 10. The outer end cap 72 may include other alternative geometries (not shown) such as a flat face or an outwardly extending bulge to improve thermal performance, by way of non-limiting example.

First insulation 120 may be disposed in the first gap 82 between the inner shell 32 and the outer shell 34. The radially-extending step 80 of the mounting member 52 seals the first insulation within the first gap 82. Second insulation 122 may be present in the second gap 108 between the inner end cap 54 and the outer end cap 72. First and second insulation 120, 122 reduce a temperature of the system 10 at a radially-outer surface 124 of the system (shown in FIG. 1).

Figure 7:
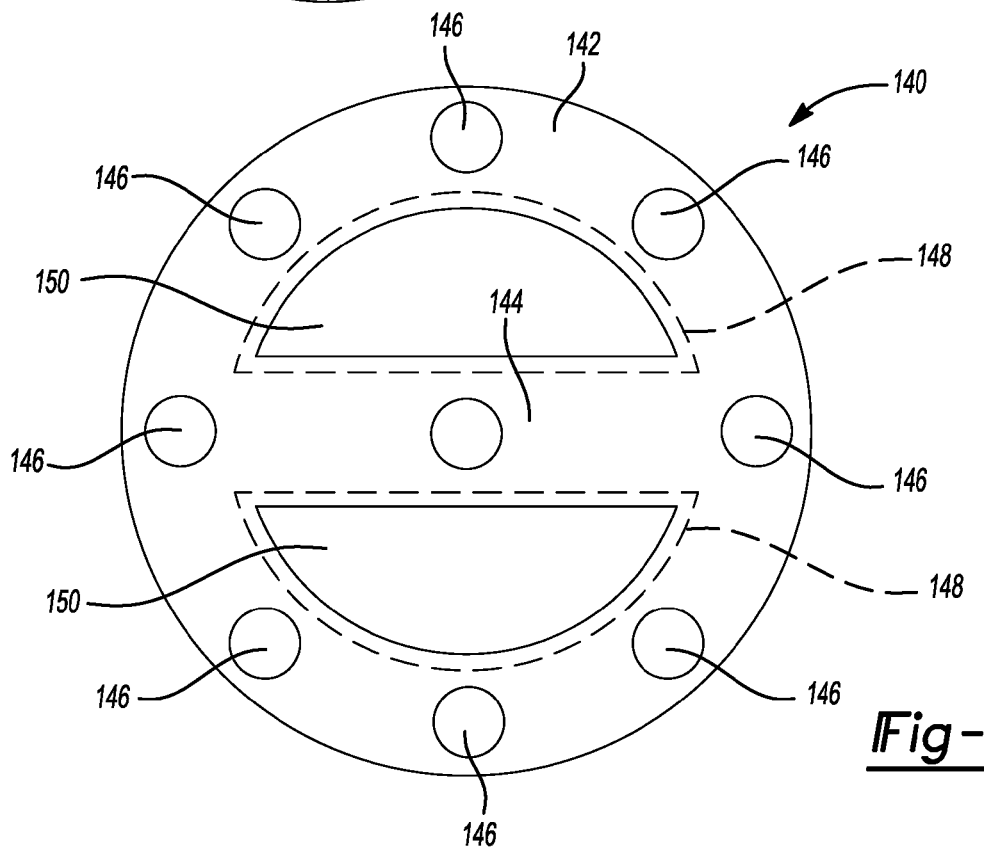
FIG. 7 is an end view of another metal mounting member constructed in accordance with the subject disclosure.

FIG. 7 illustrates an alternative mounting member 140. The mounting member 140 includes a ring 142 and a center section 144. The mounting member 140 includes a mounting provision, which may be a plurality of threaded apertures 146 that are circumferentially disposed around the ring 142 and on the center section 144. The mounting member 140 is configured to be coupled to one or more inner end caps 148. The inner end caps 148 are coupled with the mounting member 140 in a similar manner as the mounting assembly 52 of FIGS. 1-6. However, the inner end caps 148 are shaped to complement the geometry of the mounting member 140. For example, in the mounting member 140 shown, two inner end caps 148 are be included to close the semi-circular spaces 150 in the mounting member 140. It would be recognized by one skilled in the art that more than two inner end caps could be used. In addition, the mounting ring could be "U," "C," "S," "Y," "X," or "H" shaped or even two or more separate distinct thicker mounting pads interconnected by thin walled inner end caps, by way of non-limiting example.

Figure 8:
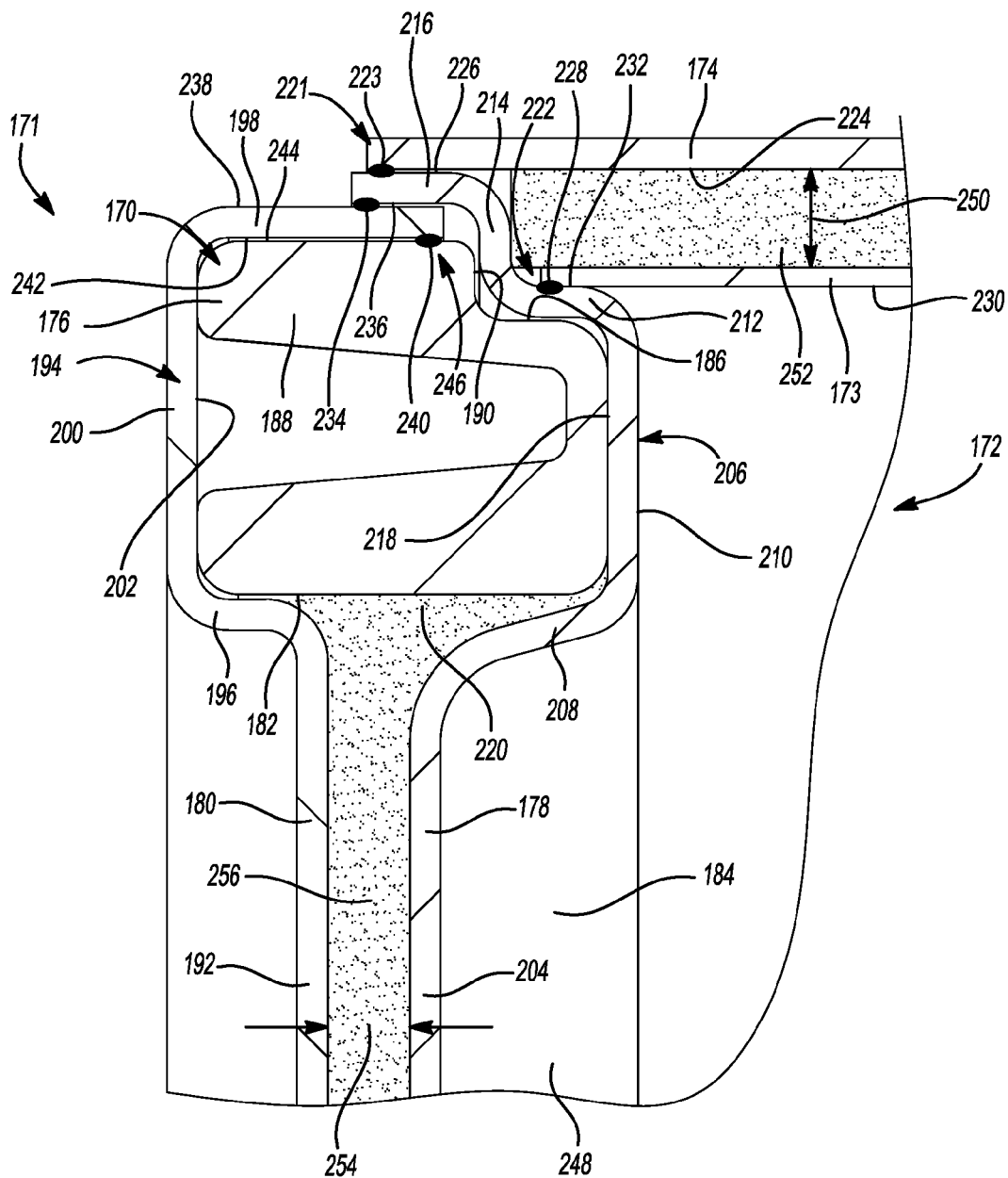
FIG. 8 is a detail view of another metal mounting assembly constructed in accordance with the subject disclosure.

FIG. 8 depicts an alternate mounting assembly 170 for an exhaust treatment device. The mounting assembly 170 includes an interior end 171 and an exterior end 172. The mounting assembly further includes a cylindrical inner shell 173, a cylindrical outer shell 174, a metal mounting member 176, and an inner end cap 178, and an outer end cap 180. The mounting member 176 may be similar to the mounting member 52 of FIGS. 1-6, and it therefore may have an annular shape and include a cylindrical radially-inner surface 182 defining a central aperture 184 and a radially-outer surface 186 including a flange 188, similar to the radially-inner surface 74, the central aperture 58, the radially-outer surface 76, and the flange 78 of the system 10 of FIGS. 1-6. A dimension of the flange 188 is set by a radially-extending step 190.

The outer end cap 180 includes a central wall 192 and a peripheral portion 194 shaped and sized to complement the mounting member 176. The peripheral portion 194 includes an axially-extending radially-inner wall 196, an axially-extending radially-outer lip 198 opposite the radially-inner wall 196, and a radially-extending peripheral wall 200 extending between the radially-inner wall 196 and the radially-outer lip 198. The peripheral portion 194 includes a pocket 202 similar to the pocket 100 of the outer end cap 72 of the system 10 of FIGS. 1-6. The mounting member 176 is partially disposed within the pocket 202.

The inner end cap 178 includes a central portion 204 and an annular peripheral portion 206 sized and shaped to complement the mounting member 176. The peripheral portion 206 includes a radially-inner wall 208 extending from the central portion 204, a radially-extending peripheral wall 210 extending from the radially-inner wall 208, an axially-extending radially-outer wall 212 extending from the peripheral wall 210, an radially-extending step 214 extending from the radially-outer wall 212, and an axially-extending lip 216 extending from the radially-extending step 214. The central portion 204, the peripheral wall 210, and the step 214 may be parallel with one another. The peripheral portion 206 defines a pocket 218. The mounting member 176 is partially disposed within the pocket 218.

The mounting member 176 is fully enclosed in an annular area 220 defined by the inner end cap 178 and the outer end cap 180. The inner end cap 178 encloses an open end 221 of the outer shell 174 and an open end 222 of the inner shell 173. A first weld 223 is disposed between a radially-inner surface 224 of the open end 221 of the outer shell 174 and a radially-outer surface 226 of the axially-extending lip 216 of the inner end cap 178 to sealingly couple the inner end cap 178 to the outer shell 174. A second weld 228 is disposed between a radially-inner surface 230 of the inner shell 173 and a radially-outer surface 232 of the radially-outer wall 212 of the inner end cap 178 to sealingly couple the inner end cap 178 to the inner shell 173. A third weld 234 is disposed between a radially-inner surface 236 of the axially-extending lip 216 of the inner end cap 178 and a radially-outer surface 238 of the radially-outer lip 198 of the outer end cap 180 to sealingly couple the inner end cap 178 to the outer end cap 180. A fourth weld 240 may be disposed between a radially-inner surface 242 of the radially-outer lip 198 of the outer end cap 180 and the radially-outer surface 244 of the flange 188 of the mounting member 176. Thus, a three-ply weld 246 is formed by the outer shell 174, the first weld 223, the axially-extending lip 216 of the inner end cap 178, the third weld 234, and the radially-outer lip 198 of the outer end cap 180. The axially-extending lip 216 of the inner end cap 178 is sandwiched between the radially-outer lip 198 of the outer end cap 180 and the open end 221 of the outer shell 174. One skilled in the art would understand that the above order could be reversed to form an alternate three-layer joint.

The three-ply weld 246 fluidly isolates the mounting member 176 from an interior chamber 248 defined by the inner shell 173, thereby reducing or eliminating a possibility of air leak. The three-ply weld 246 also isolates the mounting member 176 from a first gap 250 between the inner shell 173 and the outer shell 174. The first gap 250 may include first insulation 252. A second gap 254 is defined by the inner end cap 178 and the outer end cap 180. The second gap 154 may include second insulation 256.

Figure 9:
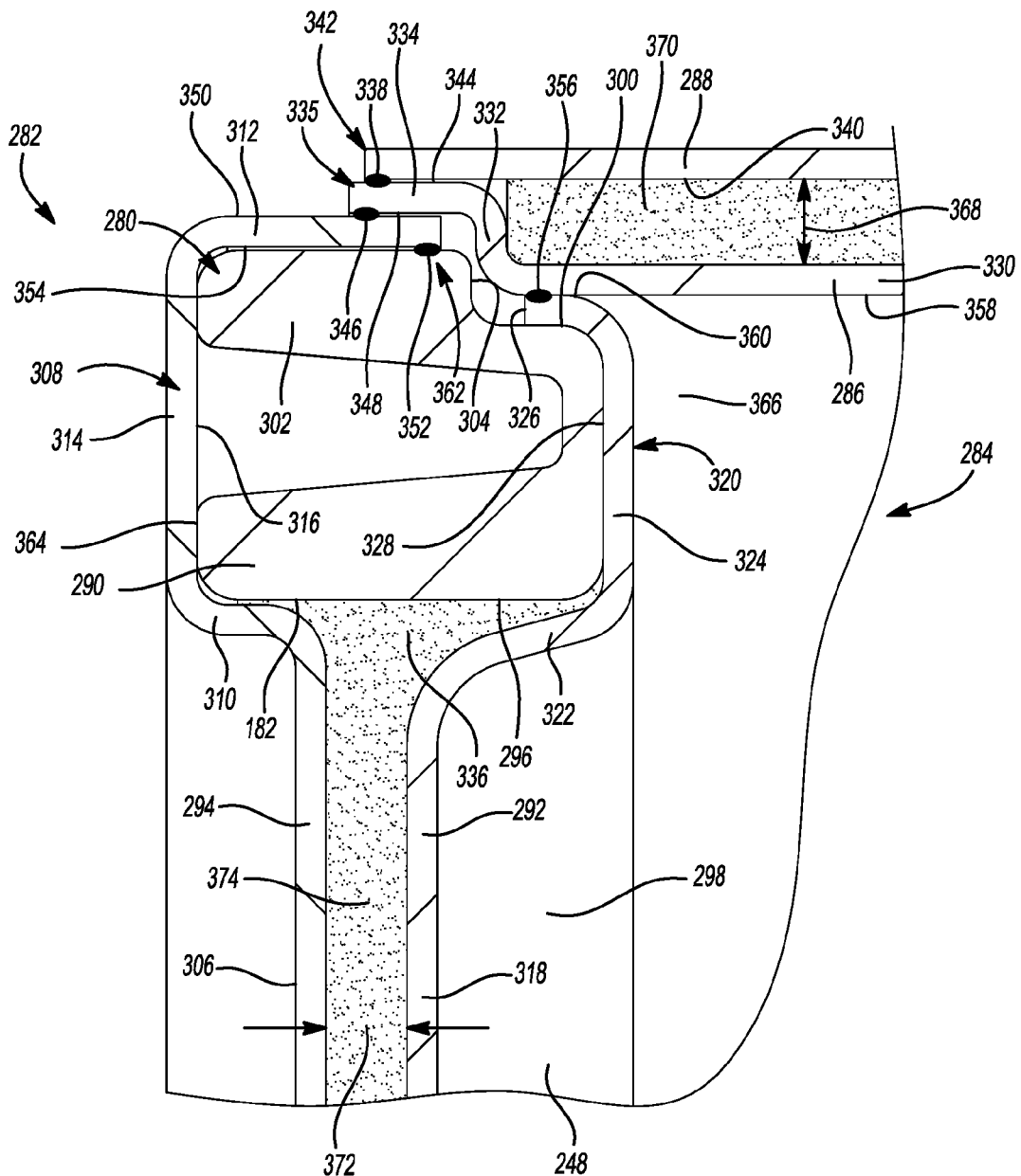
FIG. 9 is a detail view of another mounting assembly constructed in accordance with the subject disclosure.

FIG. 9 depicts an alternate mounting assembly 280 for an exhaust treatment device. The mounting assembly 280 includes an interior end 282 and an exterior end 284. The mounting assembly 280 further includes a cylindrical inner shell 286, a cylindrical outer shell 288, a metal mounting member 290, and an inner end cap 292, and an outer end cap 294. The mounting member 290 may be similar to the mounting member 52 of FIGS. 1-6. The mounting member 290 may have an annular shape and include a cylindrical radially-inner surface 296 defining a central aperture 298 and a radially-outer surface 300 including a flange 302, similar to the radially-inner surface 74, the central aperture 58, the radially-outer surface 76, and the flange 78, respectively, of the system 10 of FIGS. 1-6. A dimension of the flange 302 is set by a radially-extending step 304.

The outer end cap 294 includes a central wall 306 and a peripheral portion 308 having an axially-extending radially-inner wall 310, an axially-extending radially-outer lip 312 opposite the radially-inner wall 314, and a radially-extending peripheral wall 316 extending between the radially-inner wall 310 and the radially-outer lip 312. The peripheral portion 308 includes a pocket 317 similar to the pocket 100 of the outer end cap 72 of the system 10 of FIGS. 1-6. The pocket 317 is sized and shaped to complement the mounting member 290. The mounting member 290 is partially disposed within the pocket 317.

The inner end cap 292 includes a central portion 318 and an annular peripheral portion 320 sized and shaped to complement the mounting member 290. The peripheral portion 320 includes a radially-inner wall 322 extending from the central portion 318, a radially-extending peripheral wall 324 extending from the radially-inner wall 322, and an axially-extending radially-outer lip 326 extending from the peripheral wall 324. The central portion 318 and the peripheral wall 324 may be parallel with one another. The peripheral portion 320 defines a pocket 328 sized and shaped to complement the mounting member 290. The mounting member 290 is partially disposed in the pocket 328.

The inner shell 286 includes a cylindrical body 330, a radially-extending annular wall 332 adjacent to the cylindrical body 330, and an axially-extending lip 334 adjacent to the cylindrical body 330. The annular wall 332 and the axially-extending lip 334 are disposed at an open end 335 of the inner shell 268. The mounting member 290 is fully enclosed in an annular area 336 defined by the outer end cap 294, the inner end cap 292, and the inner shell 286.

A first weld 338 is disposed between a radially-inner surface 340 of an open end 342 of the outer shell 288 and a radially-outer surface 344 of the axially-extending lip 334 of the inner shell 286. The first weld 338 sealingly couples the outer shell 288 to the inner shell 286. A second weld 346 is disposed between a radially-inner surface 348 of the axially-extending lip 334 of the inner shell 286 and a radially-outer surface 350 of the radially-outer lip 312 of the outer end cap 294. The second weld 346 sealingly couples the inner shell 286 to the outer end cap 294. A third weld 352 is disposed between a radially-inner surface 354 of the radially-outer lip 312 of the outer end cap 294 and the radially-inner surface 296 of the mounting member 290. The third weld 352 sealingly couples the outer end cap 294 to the mounting member 290. A fourth weld 356 is disposed between a radially-inner surface 358 of the cylindrical body 330 of the inner shell 286 and a radially-outer surface 360 of the radially-outer lip 326 of the inner end cap 292. The fourth weld 356 sealingly couples the inner shell 286 to the inner end cap 292. The axially-extending lip 334 of the inner shell 286 is sandwiched between the open end 342 of the outer shell 288 and the radially-outer lip 312 of the outer end cap 294. One skilled in the art would recognize that the above order could be reversed.

The outer shell 288, the first weld 338, the axially-extending lip 334 of the inner shell 286, the second weld 346, and the radially-outer lip 312 of the outer end cap 294 form a three-ply weld 362. The three-ply weld 362 fluidly isolates a first face 364 of the mounting member 290 adjacent to the peripheral wall 314 of the outer end cap 294 from an interior chamber 366 defined by the inner shell 286, thereby reducing or eliminating a possibility of air leak. The three-ply weld 362 also isolates the mounting member from a first gap 368 defined by the inner shell 286 and the outer shell 288. The first gap 368 may include first insulation 370. A second gap 372 defined by the inner end cap 292 and the outer end cap 294 may include second insulation 374.

Figure 10:
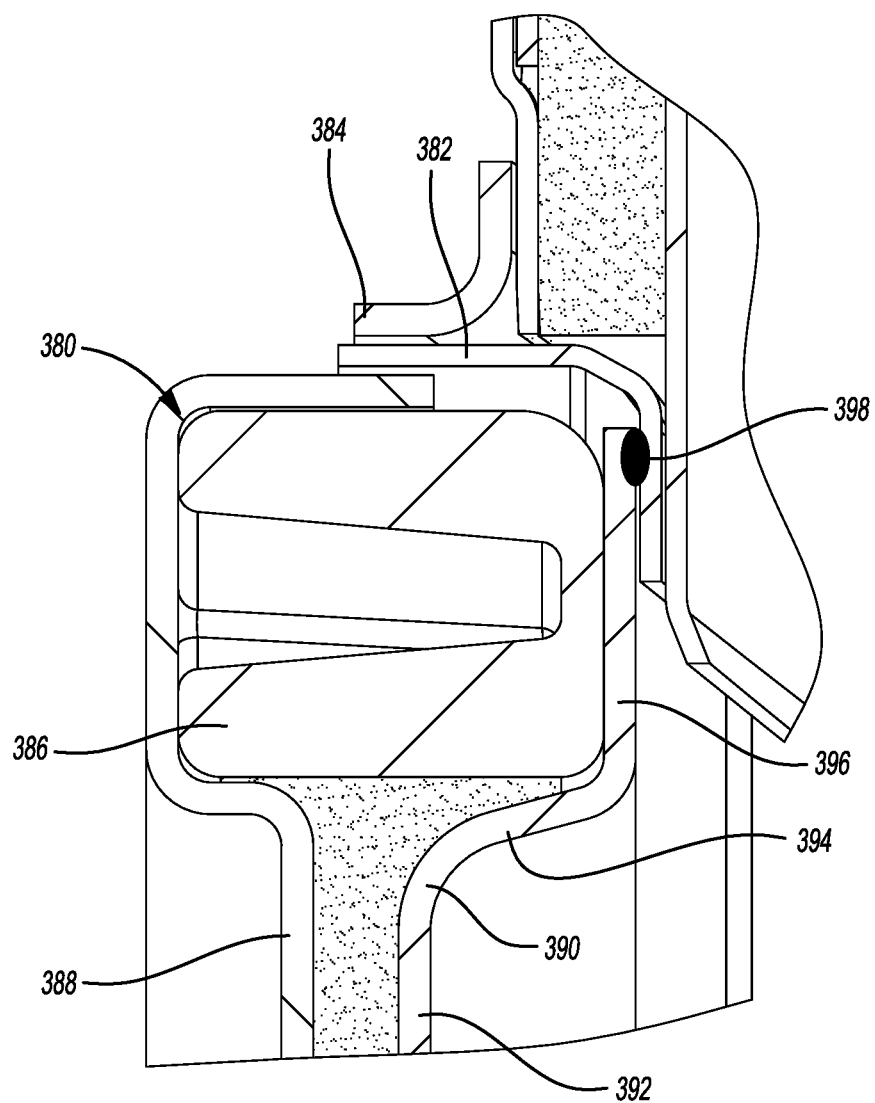
FIG. 10 is a detail view of another mounting assembly constructed in accordance with the subject disclosure.

FIG. 10 depicts an alternate mounting assembly 380 for an exhaust treatment device. The mounting assembly 380 in similar to the mounting assembly 280 of FIG. 290. Specifically, the mounting assembly 380 includes an inner shell 382, an outer shell 384, a metal mounting member 386, and an outer end cap 388 similar the inner shell 286, outer shell 288, mounting member 290, and outer end cap 294 of the mounting assembly 270 of FIG. 9, respectively. The mounting assembly 380 further includes an inner end cap 390 having a different geometry than the inner end cap 292 of FIG. 9. More specifically, the inner end cap 390 includes a central portion 392, a radially-inner wall 394 extending from the central portion 392, and a peripheral wall 396 extending from the radially-inner wall 394. The central portion 392, radially-inner wall 394, and peripheral wall 396 may be similar to the central portion 318, radially-inner wall 322, and peripheral wall 324 of the mounting assembly 280 of FIG. 9. A weld 398 may be disposed between the peripheral wall 396 and the inner shell 382 to fix the inner end cap 390 to the inner shell 382.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust gas aftertreatment system for a vehicle comprising:
    a cylindrical inner shell configured to guide exhaust gas;
    a cylindrical outer shell disposed around the inner shell, the outer shell forming a first gap to the inner shell;
    an outer end cap enclosing an open end of the outer shell, the outer end cap comprising a central wall and a peripheral portion, the peripheral portion comprising an axially-extending radially-inner wall, a peripheral wall extending from the radially-inner wall, and an axially-extending radially-outer lip extending from the peripheral wall and opposite the radially-inner wall, wherein the radially-inner wall, the peripheral wall, and the radially-outer lip define a pocket;
    a metal mounting member partially disposed within the pocket and configured to be in fluid communication with the exhaust gas, the mounting member comprising an annular body and a central aperture; and
    an inner end cap having an axially-extending lip, the axially-extending lip being coupled to the mounting member to enclose the central aperture of the mounting member, wherein the mounting member and the inner end cap enclose an open end of the inner shell.

2. The exhaust gas aftertreatment system of claim 1, further comprising insulation disposed in at least one of the first gap and a second gap defined by the inner end cap and the outer end cap.

3. The exhaust gas aftertreatment system of claim 1, wherein the mounting member includes a step to set the first gap between the inner shell and the outer shell.

4. The exhaust gas aftertreatment system of claim 1, further comprising a weld disposed between the mounting member and the inner end cap, the weld sealingly coupling the mounting member and the inner end cap.

5. The exhaust gas aftertreatment system of claim 1, wherein one of an exhaust inlet or an exhaust gas outlet is provided through one of the inner shell and the outer shell or the inner end cap and the outer end cap.

6. The exhaust gas aftertreatment system of claim 1, wherein the mounting member includes thinned areas.

7. An exhaust gas aftertreatment system for a vehicle comprising:
    a cylindrical inner shell configured to guide exhaust gas;
    a cylindrical outer shell forming a first gap to the inner shell;
    an inner end cap enclosing an open end of the outer shell and including a first axially-extending lip, the inner end cap being fixed to the inner shell;
    a metal mounting member; and
    an outer end cap fixed to the inner end cap and including a second axially-extending lip, the outer end cap and the inner end cap cooperating to encapsulate the mounting member, wherein the first axially-extending lip is sandwiched between the outer shell and the second axially-extending lip.

8. The exhaust gas aftertreatment system of claim 7, further comprising:
    a first weld disposed between the outer shell and the first axially-extending lip to sealingly couple the outer shell to the inner end cap; and
    a second weld disposed between the first axially-extending lip and the second axially-extending lip to sealingly couple the inner end cap to the outer end cap, wherein a fluidly-sealed three-ply weld comprises the outer shell, the first weld, the first axially-extending lip, the second weld, and the second axially-extending lip.

9. The exhaust gas aftertreatment system of claim 8, further comprising a third weld disposed between the inner shell and the inner end cap.

10. The exhaust gas aftertreatment system of claim 7, wherein a radially-outer surface of the mounting member includes a radially-extending flange and the flange defines an axially-extending step, the axially-extending step partially defining the first gap.

11. The exhaust gas aftertreatment system of claim 7, further comprising insulation disposed in at least one of the first gap or a second gap defined by the outer end cap and the inner end cap.

12. The exhaust gas aftertreatment system of claim 7, wherein one of an exhaust inlet or an exhaust gas outlet is provided through one of the inner shell and the outer shell or the inner end cap and the outer end cap.

13. The exhaust gas aftertreatment system of claim 7, wherein the mounting member includes thinned areas.

14. An exhaust gas aftertreatment system for a vehicle comprising:
    an inner shell configured to guide exhaust gas and having a first axially-extending lip;
    an outer shell fixed to the inner shell at the first axially-extending lip, the outer shell forming a first gap with the inner shell;
    an inner end cap;
    an outer end cap enclosing an open end of the inner shell and having a second axially-extending lip; and
    a metal mounting member enclosed in an annular area defined by the outer end cap, the inner end cap, and the inner shell, wherein the inner end cap is fixed to one of the mounting member or the inner shell and the first axially-extending lip is sandwiched between the outer shell and the second axially-extending lip.

15. The exhaust gas aftertreatment system of claim 14, further comprising:
    a first weld disposed between an open end of the outer shell and the first axially-extending lip to sealingly couple the outer shell to the inner shell; and
    a second weld disposed between the first axially-extending lip and the second axially-extending lip to sealingly couple the inner shell to the outer end cap, wherein a fluidly-sealed three-ply weld comprises the outer shell, the first weld, the first axially-extending lip, the second weld, and the second axially-extending lip.

16. The exhaust gas aftertreatment system of claim 15, further comprising a third weld disposed between the inner end cap and the inner shell.

17. The exhaust gas aftertreatment system of claim 14, wherein the mounting member includes a radially-extending flange and the flange defines an axially-extending step, the axially-extending step partially defining the first gap.

18. The exhaust gas aftertreatment system of claim 14, further comprising insulation disposed in at least one of the first gap or a second gap defined by the outer end cap and the inner end cap.

19. The exhaust gas aftertreatment system of claim 14, wherein one of an exhaust inlet or an exhaust gas outlet is provided through one of the inner shell and the outer shell or the inner end cap and the outer end cap.

20. The exhaust gas aftertreatment system of claim 14, wherein the mounting member includes thinned areas.

* * * * *